United States Patent Office 3,652,625
Patented Mar. 28, 1972

3,652,625
PROCESS FOR THE PREPARATION OF
BIS(TRIORGANOSILYL)ACETYLENE
Georges Bakassian, Caluire, and André Bazouin, Luzinay, France, assignors to Rhone-Poulenc S.A., Paris, France
No Drawing. Filed Feb. 1, 1971, Ser. No. 111,762
Claims priority, application France, Feb. 2, 1970, 7003549
Int. Cl. C07f 7/08
U.S. Cl. 260—448.2 E  10 Claims

ABSTRACT OF THE DISCLOSURE

Bis-trihydrocarbylsilyl acetylenes are obtained by reacting tetrachloroethylene and a trihydrocarbyl-chlorosilane with zinc or magnesium in the presence of a hexaalkylphosphotriamide or an N-alkylpyrrolidone.

---

The present invention relates to a process for preparing bis(triorganosilyl)acetylenes.

It is already known to prepare bis(triorganosilyl)acetylenes, which may or may not be chlorinated, by reaction of acetylene-magnesium bromide with a monochlorosilane or a dichlorosilane in tetrahydrofurane. In these reactions, the Grignard reagent is prepared by reaction of ethyl bromide and magnesium with acetylene, see U.S. patent specifications Nos. 2,671,099 and 2,671,100.

It is also known, to react tetrachloroethylene with trimethylchlorosilane, in the presence of lithium and in tetrahydrofurane, to give bis(trimethylsilyl)acetylene, see R. West and L. C. Quass, J. Organometal. Chem. 18, 55–67 (1969). The above-mentioned authors found that if lithium was replaced by magnesium, only small amounts of bis(trimethylsilyl)acetylene were obtained. It is known, on the other hand, that the reaction of tetrabromoethylene, magnesium and trimethylchlorosilane in tetrahydrofurane gives bis(trimethylsilyl)acetylene in satisfactory yields, see J. Am. Chem. Soc. 85, 2243 (1963). As this latter method requires the use of tetrabromoethylene, it is of very restricted industrial interest because this reagent is less accessible than tetrachloroethylene.

The present invention provides a process for the preparation of a bis(triorgano)silyl-acetylene of general formula

in which the radicals $R_1$, which may be identical or different, each is a monovalent hydrocarbon radical which is a saturated or unsaturated aliphatic or cycloaliphatic radical or an aromatic or aralkyl radical, which comprises reacting (a) tetrachloroethylene, (b) magnesium or zinc and (c) a chlorosilane of formula $(R_1)_3$—SiCl in a reaction medium consisting of a hexaalkylphosphotriamide or an N-alkylpyrrolidone.

The reaction can be schematically represented as follows:

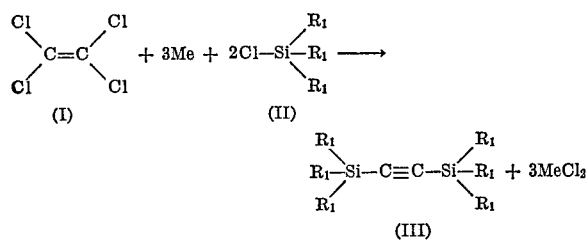

In these formulae, Me represents magnesium or zinc and the radicals $R_1$ are as defined above.

The reaction medium may be a hexaalkylphosphotriamide or N-alkyl-pyrrolidone respectively of general formulae

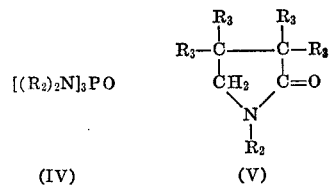

wherein, the radicals $R_2$, which may be identical or different, each is a straight or branched alkyl radical of 1 to 4 carbon atoms or a cycloalkyl radical of 5 or 6 ring carbon atoms. The radicals $R_3$, which may be identical or different, each is one of the radicals set out in the definition of $R_2$ or is a hydrogen atom. In practice, for obvious reasons of simplicity, either hexamethylphosphotriamide or N-methylpyrrolidone, which are solvents usually employed in industry, are generally used.

The process according to the invention is applicable to numerous chlorosilanes of Formula II. Amongst these, the chlorosilanes (II) wherein radicals $R_1$, which can be identical or different, each is a straight or branched alkyl or alkenyl radical of up to 4 carbon atoms, a cycloalkyl or cycloalkenyl radical having 5–6 ring carbon atoms, a phenyl radical or an alkylphenyl or phenylalkyl radical in which the alkyl group is straight or branched chain and has 1–4 carbon atoms are of particular interest.

Specific chlorosilanes which can be used include trimethylchlorosilane, methyldiphenylchlorosilane, dimethylphenylchlorosilane, vinyldimethylchlorosilane, cyclohexyldimethylchlorosilane and methylditolylchlorosilane.

The reagents can be used in varying proportions, but the optimum proportions will be close to those which take into account the stoichiometry of the reaction as set out above. However, a slight excess of metal and of organochlorosilane can be used with advantage.

The amount of solvent used is not critical. In general, at least 6 molecules of solvent are used per molecule of tetrachloroethylene, and the preferred amount is between 8 and 16 mols per mol of tetrachloroethylene involved in the reaction.

The reaction is generally carried out at a temperature of between 20 and 140° C. and preferably between 60 and 120° C. Several methods of working are possible, depending on the sequence and method of introduction of the various reagents into the reaction medium. In practice, the metal and the reaction medium are placed in the flask, the mixture is heated to the desired temperature, and the mixture consisting of the tetrachloroethylene and the chlorosilane is then introduced slowly and uniformly, whilst keeping the temperature constant. When the addition is finished, the reaction mixture is kept at a constant temperature for several hours. The bis(triorganosilyl)acetylene thus obtained is isolated from the reaction mixture by any known method. Amongst these, distillation is particularly simple and effective.

The bis(triorganosilyl)actylenes have industrial uses as described in U.S. patent specification No. 2,671,099. Amongst these, the production of silicon products possessing reactive groups by addition of various compounds to the triple bond, and the use of the compounds of the invention in polymerisation or copolymerisation reactions, are of particular importance.

The following examples are given to illustrate the invention:

EXAMPLE 1

376 g. of magnesium and 6000 ml. of hexamethylphosphotriamide are introduced into a 10 litre flask, and the contents of the flask are heated to 90° C. A mixture of 1302 g. of trimethylchlorosilane and 810 g. of tetrachloroethylene is then run in slowly in such a way that the temperature of the reaction mixture remains at between 85 and 95° C. After the end of the addition, the mixture is heated under reflux in vacuo (20 to 30 mm. Hg) for 5 hours.

The distillate obtained after the first distillation, and the contents of the traps, are thereafter rectified under atmospheric pressure. A fraction of boiling point=133–134° C., containing 630 g. (37 mols) of bis(trimethylsilyl)acetylene (100% pure) is obtained. The yield of bis-(trimethylsilyl)acetylene, relative to the tetrachloroethylene and relative to the magnesium, is 74%.

EXAMPLE 2

Following the procedure of Example 1, a mixture of 542 g. of trimethylchlorosilane and 324 g. of tetrachloroethylene is run onto 158 g. of magnesium in 1700 ml. of N-methylpyrrolidone. After rapid distillation in vacuo (20 mm.), the resulting distillate and the contents of the trap, are rectified. A fraction $F_1$ of boiling point=96–99° C., containing 162 g. of hexamethyldisiloxane and 70 g. of 1-trimethylsilyl-2-chloroacetylene, and a fraction $F_2$ of boiling point=133–134° C., containing 76 g. (0.45 mol) of pure bis(trimethylsilyl)acetylene, are obtained.

EXAMPLE 3

Following the procedure of Example 1, a mixture of 498 g. of tetrachloroethylene and 760 g. of trimethylchlorosilane is run onto 588 g. of zinc in 3500 ml. of hexamethylphosphotriamide. After rapid distillation under reduced pressure (20 mm.), the resulting distillate and the contents of the trap, are rectified. 410 g. of pure bis-(trimethylsilyl)acetylene are obtained. The yield of bis-(trimethylsilyl)acetylene, relative to the tetrachloroethylene, is 80%.

EXAMPLE 4

A mixture containing 84 g. of tetrachloroethylene and 171 g. of dimethylphenylchlorosilane is run, at 100° C., onto 39 g. of magnesium and 3000 ml. of hexamethylphosphotriamide. The temperature is kept at between 100 and 110° C. during the addition and the mixture is then heated to 140° C. for 7 hours. The unreacted dimethylphenylchlorosilane is rapidly distilled in vacuo (0.5 mm.). Thereafter, the hot reaction mixture is poured onto ice. The mixture is decanted and the aqueous layer is then extracted with three 200 cm.³ portions of petroleum ether.

After having dried the ether solution, the solvent is driven off and the residue is then distilled under reduced pressure. 85 g. of bis(dimethylphenyl)acetylene (boiling point $_{95\ mm.}$=135–139° C.) are obtained. The yield of bis-(dimethylphenyl)acetylene relative to the tetrachloroethylene is 58%.

We claim:

1. A process for the preparation of a bis(triorgano)silylacetylene of general formula

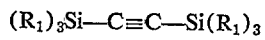

$(R_1)_3Si-C\equiv C-Si(R_1)_3$ in which the radicals $R_1$, which may be identical or different, each is a monovalent hydrocarbon radical which is a saturated or unsaturated aliphatic or cycloaliphatic radical or an aromatic or aralkyl radical, which comprises reacting (a) tetrachloroethylene, (b) magnesium or zinc and (c) a chlorosilane of formula $(R_1)_3$—SiCl in a reaction medium consisting of a hexaalkylphosphotriamide or an N-alkylpyrrolidone.

2. A process according to claim 1 wherein the hexaalkylphosphotriamide is one of the formula $[(R_2)_2N]_3PO$ where the radicals $R_2$, which may be identical or different, each is a straight or branched chain alkyl group of 1–4 carbon atoms or a cyclo-alkyl group having 5–6 ring carbon atoms.

3. A process according to claim 2 wherein the hexaalkylphosphotriamide is hexamethylphosphotriamide.

4. A process according to claim 1 wherein the N-alkyl pyrrolidone is one of formula

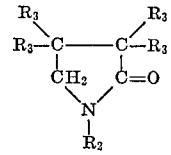

where $R_2$ is a straight or branched chain alkyl group of 1–4 carbon atoms or a cycloalkyl group having 5–6 ring carbon atoms and the $R_3$ radicals, which may be the same or different, each is a hydrogen atom or straight or branched chain alkyl group of 1–4 carbon atoms or a cycloalkyl group having 5–6 ring carbon atoms.

5. A process according to claim 4 wherein the N-alkyl-pyrrolidone is N-methyl pyrrolidone.

6. A process according to claim 1 wherein the chlorosilane is one in which the radicals $R_1$, which may be the same or different, each is a straight or branched chain alkyl radical having 1 to 4 carbon atoms or a phenyl radical.

7. A process according to claim 1 wherein about 3 gm. atoms of magnesium or zinc and about 2 gm. moles chlorosilane are used per mole of tetrachloroethylene.

8. A process according to claim 1 wherein 8–16 moles of hexaalkylphosphotriamide or N-alkyl-pyrrolidone are used per mol of tetrachloroethylene.

9. A process according to claim 1 wherein the reaction is conducted at 60–120° C.

10. A process according to claim 1 wherein about 2 moles of trimethylchlorosilane or dimethylphenylchlorosilane, about 3 gm. atoms of magnesium or zinc and about 1 gm. mole of tetrachloroethylene are reacted together in hexamethylphosphotriamide or N-methyl-pyrrolidone.

References Cited

UNITED STATES PATENTS

| | | | |
|---|---|---|---|
| 2,671,100 | 3/1954 | Frisch et al. | 260—448.2 Q |
| 2,671,101 | 3/1954 | Frisch et al. | 260—448.2 Q |
| 2,849,472 | 8/1958 | Pines et al. | 260—448.2 E |
| 2,887,371 | 5/1959 | Bennett et al. | 260—448.2 D X |
| 3,249,630 | 5/1966 | Viehe | 260—448.2 Q X |
| 3,332,916 | 7/1967 | Hay | 260—448.2 Q X |
| 3,418,385 | 12/1968 | Skinner et al. | 260—448.2 E X |

OTHER REFERENCES

Bazant et al., "Organosilicon Compound," vol. 1, Academic Press, N.Y. (1965), pp. 252–256. Copy in A.U. 112.

Noll, "Chemistry and Technology of Silicones," Academic Press, N.Y. (1968), pp. 41–49 and 131. Copy in A.U. 112.

JAMES E. POER, Primary Examiner

P. F. SHAVER, Assistant Examiner

U.S. Cl. X.R.

260—448.2 D, 448.2 Q